(12) United States Patent
Lee et al.

(10) Patent No.: US 8,420,730 B2
(45) Date of Patent: Apr. 16, 2013

(54) CAPSULATED COLORANT, METHOD OF PREPARING THE SAME, INK COMPOSITION INCLUDING THE CAPSULATED COLORANT

(75) Inventors: Jong-In Lee, Suwon-si (KR); Sang-Eum Shim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 440 days.

(21) Appl. No.: 12/715,960

(22) Filed: Mar. 2, 2010

(65) Prior Publication Data
US 2011/0046295 A1    Feb. 24, 2011

(30) Foreign Application Priority Data
Aug. 21, 2009  (KR) .................. 10-2009-0077632

(51) Int. Cl.
*C09D 11/10* (2006.01)
*B01J 13/02* (2006.01)
*A61K 9/16* (2006.01)
*C08L 31/00* (2006.01)
*C08K 3/34* (2006.01)

(52) U.S. Cl.
USPC ........... 524/548; 524/543; 524/556; 524/565; 524/555; 524/577; 427/213.34; 427/514; 523/521

(58) Field of Classification Search .................. 524/548, 524/543, 556, 565, 555, 577, 568; 427/213.34; 427/514; 523/521
See application file for complete search history.

(56) References Cited

U.S. PATENT DOCUMENTS

| 6,262,152 B1 * | 7/2001 | Fryd et al. ........................ 524/90 |
| 7,842,449 B2 * | 11/2010 | Hong et al. ............... 430/137.17 |
| 2005/0009954 A1 * | 1/2005 | Gebhard et al. ............. 523/210 |
| 2007/0026337 A1 * | 2/2007 | Hong et al. ................ 430/109.3 |

* cited by examiner

*Primary Examiner* — Michael M Bernshteyn
(74) *Attorney, Agent, or Firm* — Staas & Halsey LLP

(57) ABSTRACT

The present disclosure provides a capsulated colorant including a colorant and a polymer resin coating the colorant, wherein the polymer resin is obtained by polymerization of a polymerizable composition including a basic monomer, a macromonomer and a polymerizable unsaturated monomer; a method of preparing the capsulated colorant; and an ink composition including the capsulated colorant.

17 Claims, 11 Drawing Sheets

CAPSULATED COLORANT, METHOD OF PREPARING THE SAME, INK COMPOSITION INCLUDING THE CAPSULATED COLORANT

CROSS-REFERENCE TO RELATED PATENT APPLICATION

This application claims the benefit of Korean Patent Application No. 10-2009-0077632, filed on Aug. 21, 2009, in the Korean Intellectual Property Office, the disclosure of which is hereby incorporated by reference in its entirety for all purposes.

TECHNICAL FIELD

The present disclosure relates to a capsulated colorant, a method of preparing the same, and an ink composition including the capsulated colorant.

BACKGROUND OF RELATED ART

Colorants used in inkjet recording apparatuses may be classified as dyestuffs or pigments. Dyestuffs are used in materials to be dyed, such as fibers, leathers, furs, and papers, and provide considerable fastness in daylight, washing, friction, etc. In contrast, pigments are used in coloring matters in the form of fine particles, which are directly adhered to the surface of materials by physical means, e.g., adhesion, etc.

Dyestuffs may be dissolved in aqueous solvents. Water-soluble dye-type inks have excellent long-term storage stability, are capable of maintaining their homogeneity, and have clear color and brightness, but suffer from poor waterfastness, light resistance, etc. In contrast, pigments are generally insoluble in aqueous solvents. Thus, it is important to homogeneously disperse fine particles of pigments in aqueous solutions and maintain the dispersed state without re-aggregation. Pigment-type inks have high optical densities (OD) and excellent waterfastness and light resistance but have poor color clearness and long-term storage stability compared to dye-type inks. In addition, pigment-type inks produce images having poor dry characteristics and wet rub fastness.

During color printing (multicolor printing) with either dyestuffs or pigments, however, bleeding at interfaces of each color may occur, thereby reducing the clearness of the images. Thus, there is a need in the art to develop ink compositions having excellent storage stability, which is an advantageous characteristic of the water-soluble dye-type inks, and good waterfastness, which is an advantageous characteristic of the pigment-type inks, along with improved printing gloss, rub resistance, and without bleeding at interfaces of each color.

SUMMARY OF THE DISCLOSURE

According to one aspect the present disclosure provides a capsulated colorant including a colorant; and a polymer resin coating the colorant, wherein the polymer resin is obtained by polymerizing a polymerizable composition of a basic monomer, a macromonomer and a polymerizable unsaturated monomer.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the basic monomer includes at least one structure selected from an amine, amide, azole, pyridine, and pyrrolidone.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the basic monomer includes at least one compound selected from an acryl amide, methacryl amide, N,N-dimethylaminoethyl methacrylate, 2-vinyl pyridine, 4-vinyl pyridine, N-vinyl pyrrolidone, 1-vinyl imidazole, vinyl-N-methylpyridinium chloride, and 9-vinyl carbazole.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the macromonomer includes a water-soluble polymer having an unsaturated hydrocarbon.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the macromonomer includes at least one compound selected from an unsaturated polyethylene glycol-based compound, an unsaturated polyester-based compound, an unsaturated acrylate-based compound, an unsaturated polyamide-based compound, an unsaturated epoxy resin-based compound, an unsaturated polystyrene-based compound, and an unsaturated fatty acid-based compound.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the macromonomer includes at least one compound selected from polyethylene glycol (PEG)-methacrylate, polyethylene glycol (PEG)-ethyl ether methacrylate, polyethylene glycol (PEG)-dimethacrylate, polyethylene glycol (PEG)-modified urethane, polyethylene glycol (PEG)-modified polyester, polyethylene glycol (PEG)-hydroxyethyl methacrylate, polyethylene glycol (PEG)-polystyrene, polyethylene glycol (PEG)-methacrylic silicon, polyester acrylate, hexafunctional polyester acrylate, dendritic polyester acrylate, carboxy polyester acrylate, polyester methacrylate, polymethyl methacrylate, polystyrene-acrylonitrile, polybutyl acrylate, polyisobutylmethacrylate, fatty acid modified epoxy acrylate, and derivatives thereof.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the polymerizable unsaturated monomer includes at least one compound selected from a compound having at least two double bonds, unsaturated carboxylic acid, vinyl cyanide monomer, unsaturated carboxylic acid alkyl ester, unsaturated carboxylic acid hydroxyalkyl ester, unsaturated carboxylic acid amide, aromatic vinyl monomer, methyl vinyl ketone, and vinylidene chloride.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the amount of the basic monomer is in the range of about 1 to about 80 parts by weight based on 100 parts by weight of the polymerizable unsaturated monomer.

According to another aspect the present disclosure provides a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the amount of the macromonomer is in the range of about 1 to about 100 parts by weight based on 100 parts by weight of the polymerizable unsaturated monomer.

According to another aspect the present disclosure provides a method of preparing a capsulated colorant, including: a) emulsifying a polymerization composition of a polymerizable unsaturated monomer, a basic monomer, a macromonomer, a water-soluble medium, a colorant, an emulsifier, and a polymerization initiator; and b) forming a polymer resin coating the colorant by polymerizing the polymerizable unsaturated monomer, the basic monomer, and the macromonomer on the colorant.

According to another aspect the present disclosure provides a method of preparing a capsulated colorant, including: a) emulsifying a polymerization composition of a polymerizable unsaturated monomer, a basic monomer, a macromonomer, a water-soluble medium, a colorant, an emulsifier, and a polymerization initiator; and b) forming a polymer resin coating the colorant by polymerizing the polymerizable unsaturated monomer, the basic monomer, and the macromonomer on the colorant.

According to another aspect the present disclosure provides a method of preparing a capsulated colorant, including: a) emulsifying a polymerization composition of a polymerizable unsaturated monomer, a basic monomer, a macromonomer, a water-soluble medium, a colorant, an emulsifier, and a polymerization initiator; and b) forming a polymer resin coating the colorant by polymerizing the polymerizable unsaturated monomer, the basic monomer, and the macromonomer on the colorant, wherein the polymerization composition includes about 1 to about 80 parts by weight of the basic monomer, about 1 to about 100 parts by weight of the macromonomer, about 500 to about 5,000 parts by weight of the water-soluble medium, about 10 to about 500 parts by weight of the colorant, about 0.1 to about 20 parts by weight of the emulsifier, and about 0.1 to about 10 parts by weight of the polymerization initiator based on 100 parts by weight of the polymerizable unsaturated monomer.

According to another aspect the present disclosure provides an ink composition of a capsulated colorant including a colorant; and a polymer resin coating the colorant, wherein the polymer resin is obtained by polymerizing a polymerizable composition of a basic monomer, a macromonomer, and a polymerizable unsaturated monomer.

According to another aspect the present disclosure provides an ink composition of a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the ink composition includes about 1 to about 20 parts by weight of the capsulated colorant; and about 80 to about 99 parts by weight of the solvent.

According to another aspect the present disclosure provides an ink composition of a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the solvent is water; or a mixed solution of at least one organic solvent selected from monohydric alcohol, polyhydric alcohol, ketone, ester, a nitrogen-containing solvent, and a sulfur-containing solvent, and water.

According to another aspect the present disclosure provides an ink composition of a capsulated colorant including a colorant; and a polymer resin coating the colorant, wherein the polymer resin is obtained by polymerizing a polymerizable composition of a basic monomer, a macromonomer, and a polymerizable unsaturated monomer, wherein the ink composition has a surface tension of about 15 to about 70 dyne/cm at 20° C.; and a viscosity of about 1 to about 20 cps.

According to another aspect the present disclosure provides an ink set including at least two types of ink compositions of a capsulated colorant including a colorant; and a polymer resin coating the colorant, wherein the polymer resin is obtained by polymerizing a polymerizable composition of a basic monomer, a macromonomer, and a polymerizable unsaturated monomer.

According to another aspect the present disclosure provides an ink cartridge for an inkjet recording apparatus including at least two types of ink compositions of a capsulated colorant including a colorant; and a polymer resin coating the colorant, wherein the polymer resin is obtained by polymerizing a polymerizable composition of a basic monomer, a macromonomer, and a polymerizable unsaturated monomer.

According to another aspect the present disclosure provides an inkjet recording apparatus including an ink cartridge for an inkjet recording apparatus of at least two types of ink compositions of a capsulated colorant including a colorant; and a polymer resin coating the colorant, wherein the polymer resin is obtained by polymerizing a polymerizable composition of a basic monomer, a macromonomer, and a polymerizable unsaturated monomer.

BRIEF DESCRIPTION OF THE DRAWINGS

Various features and advantages of the present disclosure will become more apparent from the description herein of detail several embodiments thereof in reference to the attached drawings, in which.

DETAILED DESCRIPTION OF SEVERAL EMBODIMENTS

The present disclosure will now be described more fully with reference to the accompanying drawings, in which several embodiments of the present disclosure are shown.

An aspect of the present disclosure provides a capsulated colorant including a colorant and a polymer resin coating the colorant. The colorant may include a dyestuff or a pigment. Any colorant that is commonly used in the art may be used. That is, the colorant may include but is not limited to direct dyes, acid dyes, edible dyes, alkali dyes, reactive dyes, dispersing dyes, oil dyes, various pigments, self-dispersing pigments, or a mixture thereof, and the like.

Examples of the dyestuff may include but are not limited to food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, disazo dyes, phthalocyanine derivatives, and the like. Examples of the pigments may include but are not limited to carbon black, graphite, vitreous carbon, activated charcol, activated carbon, anthraquinone, phthalocyanine blue, phthalocyaniene green, diazos, monoazos, pyranthrones, perylene, quinacridone, indigoid pigments, self-dispersing pigments such as, e.g., cabojet-series and CW-series (produced by Orient Chemical Industries, Ltd. of Osaka, Japan), and the like.

Figure 1:
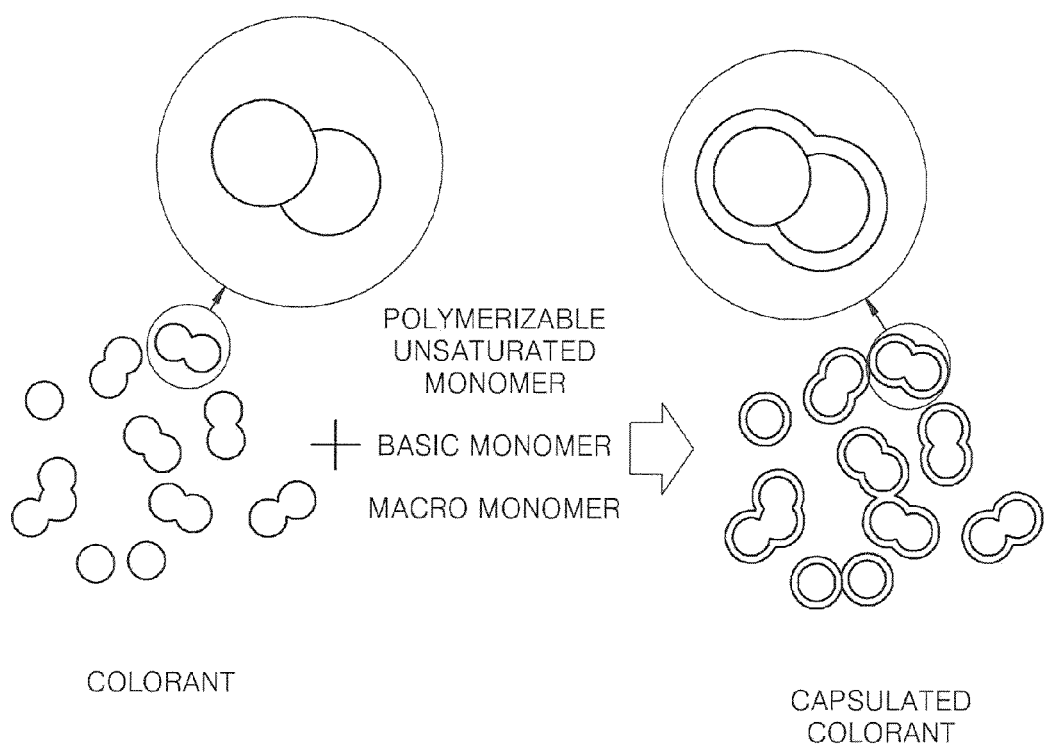
FIG. 1 schematically shows a method of preparing a capsulated colorant using a polymerization composition including a basic monomer, a macromonomer and a polymerizable unsaturated monomer.

The polymer resin coating the colorant may be prepared by polymerizing a composition including a basic monomer, a macromonomer and a polymerizable unsaturated monomer. FIG. 1 schematically shows a method of preparing a capsulated colorant using a polymerization composition including a basic monomer, a macromonomer and a polymerizable unsaturated monomer according to an embodiment of the present disclosure.

The colorant may be a self-dispersing pigment having hydrophilic ionic groups on its surface and thus, the surface of the colorant may have negative charges. If a polymerization composition containing the basic monomer is added to a colorant having a negative charge, the surface of the colorant may be efficiently coated with the polymer resin since the efficiency of the reaction between the colorant and the basic monomer increases on the surface of the colorant due to the electrostatic interaction. As a result, the amount of the polymer resin that is not coated on the colorant may be considerably reduced.

In addition, a macromonomer may be used instead of an emulsifier to co-polymerize, i.e. form chemical bonds, with the polymerizable unsaturated monomer and the basic monomer, thereby permanently maintaining dispersion stability of an emulsion obtained by the result of the co-polymerization.

The basic monomer may include but is not limited to at least one structure selected from an amine, amide, azole, pyridine and pyrrolidone structures. Specifically, the basic monomer may include at least one compound selected from an acryl amide, methacryl amide, N,N-dimethylaminoethyl methacrylate, 2-vinyl pyridine, 4-vinyl pyridine, N-vinyl pyrrolidone, 1-vinyl imidazole, vinyl-N-methylpyridinium chloride 9-vinyl carbazole and the like.

The macromonomer may be a water-soluble polymer including an unsaturated hydrocarbon that may participate in polymerization at one end of the water-soluble polymer. The macromonomer may include but is not limited to at least one compound selected from an unsaturated polyethylene glycol-based compound, an unsaturated polyester-based compound, an unsaturated acrylate-based compound, an unsaturated polyamide-based compound, an unsaturated epoxy resin-based compound, an unsaturated polystyrene-based compound, an unsaturated fatty acid-based compound and the like.

In particular, the unsaturated polyethylene glycol based-compound may include but is not limited to unsaturated polyethylene glycol and derivatives thereof, polyethylene glycol (PEG)-methacrylate, polyethylene glycol (PEG)-ethyl ether methacrylate, polyethylene glycol (PEG)-dimethacrylate, polyethylene glycol (PEG)-modified urethane, polyethylene glycol (PEG)-modified polyester, polyethylene glycol (PEG)-hydroxyethyl methacrylate, polyethylene glycol (PEG)-polystyrene, polyethylene glycol (PEG)-methacrylic silicon, and derivatives thereof.

The unsaturated polyester-based compound includes unsaturated polyester and derivatives thereof, and may include but is not limited to polyester acrylate, hexafunctional polyester acrylate, dendritic polyester acrylate, carboxy polyester acrylate, polyester methacrylate, and derivatives thereof.

The polyacrylate-based compound includes polyacrylate and derivatives thereof, and may include but is not limited to polymethyl methacrylate, polystyrene-acrylonitrile, polybutyl acrylate, polyisobutylmethacrylate, and derivatives thereof.

The unsaturated fatty acid-based compound includes unsaturated fatty acid and derivatives thereof, and may include but is not limited to fatty acid modified epoxy acrylate and the like.

The macromonomer may include but is not limited to at least one compound selected from polyethylene glycol (PEG)-methacrylate, polyethylene glycol (PEG)-ethyl ether methacrylate, polyethylene glycol (PEG)-dimethacrylate, polyethylene glycol (PEG)-modified urethane, polyethylene glycol (PEG)-modified polyester, polyethylene glycol (PEG)-hydroxyethyl methacrylate, polyethylene glycol (PEG)-polystyrene, polyethylene glycol (PEG)-methacrylic silicon, polyester acrylate, hexafunctional polyester acrylate, dendritic polyester acrylate, carboxy polyester acrylate, polyester methacrylate, polymethyl methacrylate, polystyrene-acrylonitrile, polybutyl acrylate, polyisobutylmethacrylate, fatty acid modified epoxy acrylate, and derivatives thereof.

In this regard, the polymerizable unsaturated monomer may include but is not limited to at least one compound selected from a compound having at least two double bonds, unsaturated carboxylic acid, vinyl cyanide monomer, unsaturated carboxylic acid alkyl ester, unsaturated carboxylic acid hydroxyalkyl ester, unsaturated carboxylic acid amide, aromatic vinyl monomer, methyl vinyl ketone, vinylidene chloride and the like.

In particular, the compound having at least two double bonds may include but is not limited to at least one of butadiene and pentadiene; the unsaturated carboxylic acid may include but is not limited to at least one compound selected from methacrylic acid, acrylic acid, itaconic acid, crotonic acid, fumaric acid, and maleic acid; the unsaturated polycarboxylic acid alkyl ester may include but is not limited to at least one compound selected from itaconic acid monoethyl ester, fumaric acid monobutyl ester and maleic acid monobutyl ester; the vinyl cyanide monomer may include but is not limited to acrylonitrile or methacrylonitrile; the unsaturated carboxylic acid amide may include but is not limited to acryl amide, methacryl amide, itaconic amide or maleic acid mono amide; and the aromatic vinyl monomer may include but is not limited to styrene, α-methylstyrene, vinyl toluene, p-methylstyrene, and derivatives thereof.

According to an aspect of the present disclosure, there may also be provided a method of preparing a capsulated colorant, the method including the steps of: a) emulsifying a polymerization composition including a basic monomer, a macromonomer, a polymerizable unsaturated monomer, a water-soluble medium, a colorant, an emulsifier, and polymerization initiator; and b) forming a polymer resin coating the colorant by polymerizing the polymerizable unsaturated monomer, the basic monomer, and a crosslinkable monomer on the colorant.

The basic monomer may include but is not limited to at least one chemical structure selected from an amine, amide, azole, pyridine, pyrrolidone, and the like. In one embodiment, the amount of the basic monomer may be in the range of about 1 to about 80 parts by weight based on 100 parts by weight of the polymerizable unsaturated monomer. In another embodiment, the amount of the basic monomer may be in the range of about 10 to about 50 parts by weight based on 100 parts by weight of the polymerizable unsaturated monomer. If the amount of the basic monomer is within the ranges described above, an electrostatic interaction between the colorant and the basic monomer may occur, thereby reducing the amount of the polymer resin in an aqueous solution, and inhibiting clogging of the colorant with a large particle size.

The polymerizable unsaturated monomer may include but is not limited to at least one monomer selected from a compound having at least two double bonds, unsaturated carboxylic acid, vinyl cyanide monomer, unsaturated carboxylic acid alkyl ester, unsaturated carboxylic acid hydroxyalkyl ester, unsaturated carboxylic acid amide, aromatic vinyl monomer, methyl vinyl ketone, vinylidene chloride and the like.

In one embodiment, the amount of the macromonomer may be in the range of about 1 to about 100 parts by weight. In another embodiment, the amount of the macromonomer may be in the range of about 5 to about 50 parts by weight based on 100 parts by weight of the polymerizable unsaturated monomer. If the amount of the macromonomer is within the ranges described above, emulsibility of the macromonomer may increase, thereby preventing the colorant from clogging or forming a polymer.

The water-soluble medium may be water or a mixture of water and an organic solvent. In one embodiment, the amount of the water-soluble medium may be in the range of about 500 to about 5,000 parts by weight. In another embodiment, the amount of the water-soluble medium may be in the range of about 1,500 to about 3,000 parts by weight based on 100 parts by weight of the polymerizable unsaturated monomer. If the amount of the water-soluble medium is within the ranges described above, the reaction velocity may be appropriately controlled to prevent the polymer resin coating the colorant from being too thick, and the monomer may be easily transferred to each of the reaction sites so that the resin is properly coated.

The colorant may include but is not limited to direct dyes, acid dyes, edible dyes, alkali dyes, reactive dyes, dispersing dyes, oil dyes, various pigments, self-dispersing pigments, and the like, or any mixture thereof. In one embodiment, the amount of the colorant may be in the range of about 10 to about 500 parts by weight based on 100 parts by weight of the polymerizable unsaturated monomer. In another embodiment, the amount of the colorant may be in the range of about 20 to about 300 parts by weight based on 100 parts by weight of the polymerizable unsaturated monomer. If the amount of the colorant is within the range described above, the amount of the polymer resin coated on the colorant may be properly controlled.

The emulsification may be direct emulsification in which a colorant dispersion is emulsified in a water-soluble medium including the basic monomer, the polymerizable unsaturated monomer, and the macromonomer using a homogenizer such as a homo mixer, a line mixer or a high pressure homogenizer, or natural emulsification in which a macromonomer is added to a colorant dispersion in a polymerizable unsaturated monomer and the mixture is poured into a large amount of water.

In addition, phase transition emulsification in which a macromonomer is added to a colorant dispersion in the basic monomer and the polymerizable unsaturated monomer, and water is added in a small amount while stirring the mixture may be used. The water-soluble medium and the macromonomer may be added to the colorant dispersion and the mixture stirred. The basic monomer and the polymerizable unsaturated monomer may be added to perform emulsification.

The polymerization initiator may include but is not limited to a water-soluble or oil-soluble persulfate, a peroxide, an azo compound, or a peroxide, and a reducing agent, for example, a redox composition contained in a combination of sulfite, and the like. Examples of the polymerization initiator may include but is not limited to ammonium persulfate, potassium persulfate, sodium persulfate, hydrogen peroxide, t-buyl hydroxy peroxide, t-butyl peroxy benzoate, 2,2-azobis-isobutyronitrile, 2,2-azobis(2-diaminopropane)hydrochloride, 2,2-azobis(2,4-dimethylvaleronitrile), and the like. In one embodiment, the amount of the polymerization initiator may be in the range of about 0.1 to about 10 parts by weight based on 100 parts by weight of the polymerizable unsaturated monomer. In another embodiment, the amount of the polymerization may be in the range of about 0.5 to 5 parts by weight based on 100 parts by weight of the polymerizable unsaturated monomer. If the amount of the polymerization initiator is within the ranges described above, a reaction may be smoothly initiated and a reaction velocity may be appropriately controlled.

The polymerization initiator may be added during polymerization with other ingredients such as the polymerizable unsaturated monomer, the basic monomer, the macromonomer, the water-soluble medium, the colorant, a crosslinkable monomer, a chain transfer agent, and the emulsifier in the initial stage of the reaction, or added after emulsifying the other ingredients and heating the mixture. The reaction velocity may not be easily controlled when the polymerization initiator is added in the initial stage of the reaction, but the reaction velocity may be easily controlled when the polymerization initiator is added after emulsification.

In addition, if desired, the polymerization composition may further include additives such as a UV absorber, an antioxidant, a color developer, and a chain transfer agent. The degree of cross-linking the polymer resin, which is contained in the capsulated colorant, may be controlled by regulating the amount and methods of adding the chain transfer agent.

The present disclosure also provides an ink composition including the capsulated colorant, an organic solvent, and water. In one embodiment, the amount of the capsulated colorant in the ink composition may be in the range of about 1 to about 20 parts by weight based on 100 parts by weight of the ink composition. In another embodiment, the amount of the capsulated colorant in the ink composition may be in the range of about 2 to about 10 parts by weight based on 100 parts by weight of the ink composition. In yet another embodiment, the amount of the capsulated colorant in the ink composition may be in the range of about 3 to about 6 parts by weight, based on 100 parts by weight of the ink composition. If the amount of the capsulated colorant is within the ranges described above, desired optical density may be obtained, and inkjet ejecting efficiency may be improved by preventing increase in viscosity.

The solvent used in the ink composition may be a water-based solvent, and may further include but is not limited to at least one organic solvent. In one embodiment, the amount of the solvent may be in the range of about 80 to about 99 parts by weight based on 100 parts by weight of the ink composition. In another embodiment, the amount of the solvent may be in the range of about 83 to about 95 parts by weight based on 100 parts by weight of the ink composition. In yet another embodiment, the amount of the solvent may be in the range of about 85 to about 93 parts by weight, based on 100 parts by weight of the ink composition. If the amount of the solvent is within the ranges described above, viscosity and surface tension of the ink composition may have desired levels to prevent decrease in ejection efficiency.

The organic solvent contained in the solvent may include but is not limited to at least one organic solvent selected from monohydric alcohol, polyhydric alcohol, ketone, ester, a nitrogen-containing solvent, a sulfur-containing solvent, and the like.

The monohydric alcohol based solvent may include but is not limited to methyl alcohol, ethyl alcohol, n-propyl alcohol, isopropyl alcohol, n-butyl alcohol, sec-butyl alcohol, t-butyl alcohol, isobutyl alcohol, and the like. The ketone may include but is not limited to acetone, methylethyl ketone, diethyl ketone, diacetone alcohol, and the like. The ester may include but is not limited to methyl acetate, ethyl acetate, ethyl lactate, and the like. The polyhydric alcohol may include but is not limited to ethylene glycol, diethylene glycol, triethylene glycol, propylene glycol, butylene glycol, 1,4-buthandiol, 1,2,4-buthantriol, 1,5-pentanediol, 1,6-hexanediol, 1,2,6-hexanetriol, hexylene glycol, glycerol, glycerol ethoxylate, trimethylol propane ethoxylate, and the like.

Without being limited by such a theory, it is thought that the monohydric alcohol controls surface tension of ink to improve permeation and dot formation properties in a recording medium such as paper for professional or nonprofessional use and drying properties of the printed image. The polyhydric alcohol and derivatives thereof are not easily evaporated, and lower the freezing point of the ink to improve storage stability of the ink, thereby preventing nozzles from being blocked.

Examples of the nitrogen-containing compound may include but is not limited to 2-pyrrolidone, N-methyl-2-pyrrolidone, and the like. Examples of the sulfur-containing compound may include but is not limited to dimethyl sulfoxide, tetramethyl sulfone, thioglycol and the like.

In one embodiment, when the organic solvent is used together with the water-based solvent such as water, the amount of the organic solvent may be in the range of about 0.1 to about 130 parts by weight based on 100 parts by weight of water. In another embodiment, the amount of the organic solvent may be in the range of about 10 to about 50 parts by weight based on 100 parts by weight of water. If the amount of the organic solvent is within the range described above, the surface tension and viscosity of ink may have desired levels for inkjet ejection, and thus the inkjet ejection properties may be improved.

The ink composition according to the present disclosure may further include various additives to improve properties of the ink composition, and more particularly may include but is not limited to at least one additive selected from a wetting agent, a dispersing agent, a surfactant, a viscosity modifier, a pH regulator, and an antioxidizing agent. In one embodiment, the amount of the additives may be in the range of about 0.5 to about 600 parts by weight based on 100 parts by weight of the colorant. In another embodiment, the amount of the additives may be in the range of about 10 to about 300 parts by weight based on 100 parts by weight of the colorant. If the amount of the additives is within the ranges described above, effects of the additives may be sufficiently expressed, and storage stability of the ink composition may be maintained.

In particular, the surfactant may be, for example, an ampholytic, an anionic, a cationic or a nonionic surfactant. Accordingly, any surfactant may be used according to the purposes thereof without limitation. The surfactant may be used alone or in a combination of at least two of the surfactants described above.

Examples of the ampholytic surfactant may include but are not limited to alanine, dodecyldi(aminoethyl)glycine, di(o-ctylaminoethyl)glycine, N-alkyl-N,N-dimethyl ammonium betane, and the like. Examples of the anionic surfactant may include but are not limited to alkylbenzene sulfonate, $\alpha$-olefin sulfonate, polyoxyethylene alkyl ether acetate, phosphate ester, and the like. Examples of the cationic surfactant may include but are not limited to an amine salt surfactant such as alkyl amine salt, aminoalcohol fatty acid derivatives, polyamine fatty acid derivatives, imidazoline, and the like; or a quaternary ammonium salt surfactant such as alkyltrimethyl ammonium salt, dialkyldimethyl ammonium salt, alkyldimethyl benzylammonium salt, pyridinium salt, alkylisoquinolinium salt, benzethonium chloride salt, and the like. Examples of the nonionic surfactant may include but are not limited to polyoxyethylenealkylether surfactant, polyoxyethylenealkylphenylether surfactant, acetylene glycol surfactant and the like.

Among these surfactants, the nonionic surfactant may be used due to its excellent antifoaming properties. The nonionic surfactant may include but is not limited to SURFYNOL of Air Products, Inc. having an acetylenic ethoxylated diol structure, TERGITOL of Union Carbide Corporation having a polyethylene oxide or polypropylene oxide structure, Tween having a polyoxyethylene sorbitan fatty acid ester structure and the like.

In one embodiment, the ink composition may have a surface tension of about 15 to about 70 dyne/cm at 20° C.; and a viscosity of about 1 to about 20 cps. In another embodiment, the ink composition may have a surface tension of about 15 to about 70 dyne/cm at 20° C.; and a viscosity of about 1.5 to about 3.5 cps. In another embodiment, the ink composition may have a surface tension of about 25 to about 55 dyne/cm at 20° C., and a viscosity of about 1 to about 20 cps. In yet another embodiment, the ink composition may have a surface tension of about 25 to about 55 dyne/cm at 20° C., and a viscosity of about 1.5 to about 3.5 cps at 20° C. If the surface tension is within the ranges described above, printing efficiency may be improved, and if the viscosity is within the ranges described above, ejection may be properly performed.

The present disclosure provides an ink set including at least two types of ink compositions including the capsulated colorant. The ink set may be used in an ink receiving unit of an inkjet recording apparatus or an ink cartridge for an inkjet recording apparatus. An inkjet recording apparatus according to the present disclosure may include a thermal head from which ink droplets are ejected by vapour pressure obtained by heating the ink composition, a piezo head from which ink droplets are ejected by a piezo device, a disposable head or a permanent head. In addition, the inkjet recording apparatus may be a scanning type printer or an array type printer, and may be used for a desktop, textile and industrial purpose.

Figure 2:
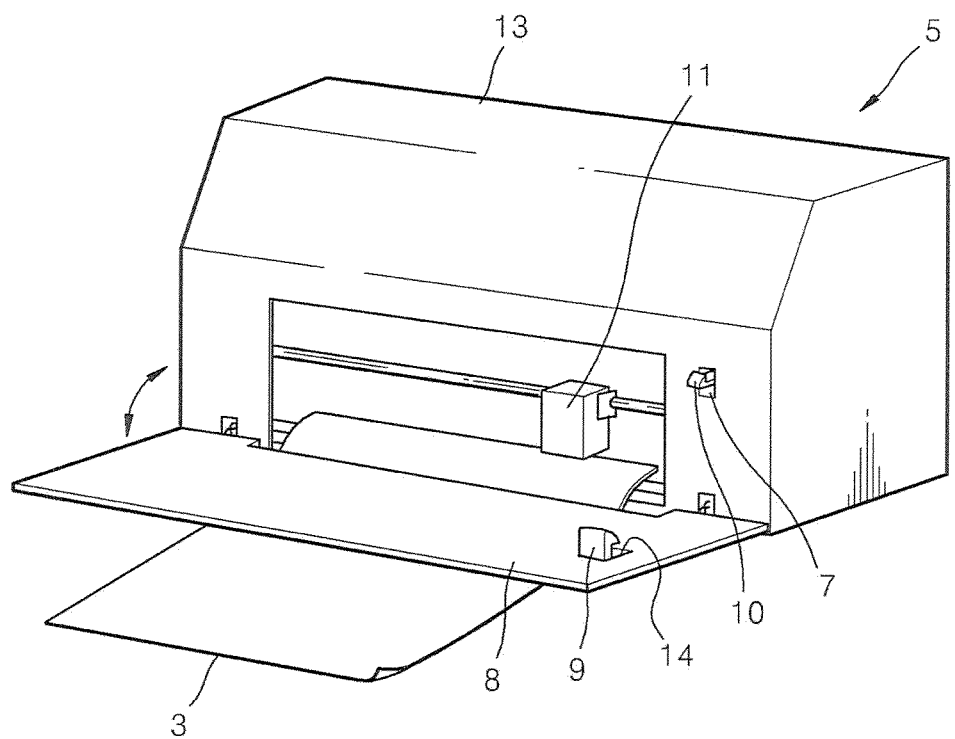
FIG. 2 is a perspective view of an inkjet recording apparatus including an ink cartridge.

The head types, printer types, and uses of the inkjet recording apparatus are described below for illustrative purposes only and are not limited to the following descriptions. FIG. 2 is a perspective view of an inkjet recording apparatus including an ink cartridge according to an embodiment of the present disclosure. Referring to FIG. 2, the inkjet recording apparatus includes an ink cartridge for including an ink composition. A printer cover 8 is connected to a main body 13 of the inkjet recording apparatus 5. An engaging portion of a movable latch 10 protrudes through a hole 7. The movable latch 10 engages with a fixed latch 9 that is coupled to an inner side of the printer cover 8 when the printer cover 8 is closed. The printer cover 8 has a recess 14 in a region corresponding to the engaging portion of the movable latch 10 protruding through the hole 7. A cartridge 11 for an inkjet recording apparatus is positioned such that ink is ejected onto paper 3 that passes under the ink cartridge 11.

Figure 3:
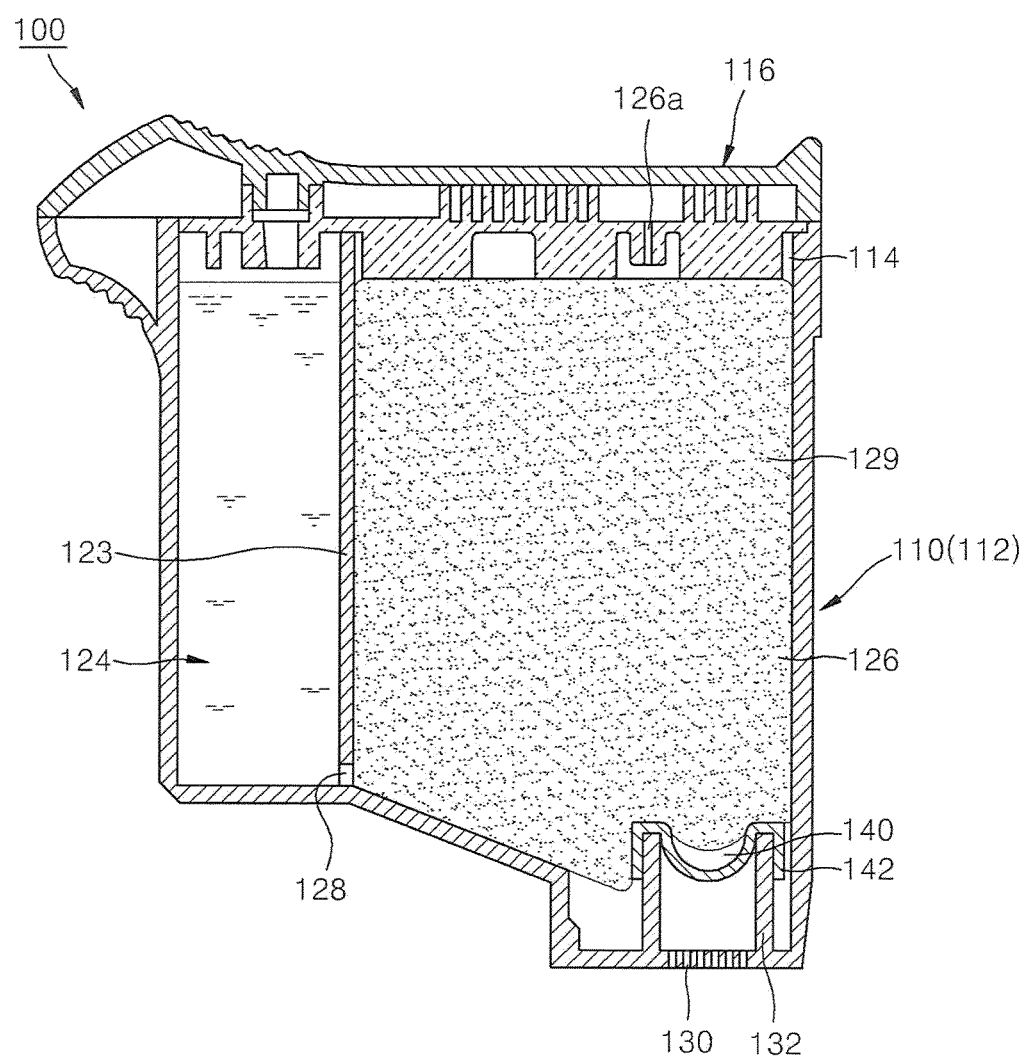
FIG. 3 is a cross sectional view of an ink cartridge for an inkjet recording apparatus.

FIG. 3 is a cross sectional view of an ink cartridge for an inkjet recording apparatus according to an embodiment of the present disclosure. Referring to FIG. 3, the ink cartridge 100 for an inkjet recording apparatus includes an ink cartridge main body 110 including an ink storage tank 112, an inner cover 114 covering a top portion of the ink storage tank 112, and an outer cover 116 that is spaced apart from the inner cover 114 by a predetermined distance and seals the ink storage tank 112 and the inner cover 114. The ink storage tank 112 is partitioned into a first chamber 124 and a second chamber 126 by a vertical barrier wall 123. An ink passage 128 is disposed between the first chamber 124 and the second chamber 126 on a bottom portion of the vertical barrier wall 123. The first chamber 124, the sponge 129, and the second chamber 126 are filled with ink. A bent hole 126a corresponding to the second chamber 126 is disposed in the inner cover 114. A filter 140 is disposed at a lower portion of the second chamber 126, so that ink impurities and fine bubbles are filtered to prevent ejection holes of a printer head 130 from being blocked. A hook 142 is formed at the edge of the filter 140 and coupled to a top portion of a standpipe 132. Thus, ink is ejected from the ink storage tank 112 onto a printing medium in a liquid-drop form through the ejection holes of the printer head 130. The cartridge for an inkjet recording apparatus may also be used in conjunction with a printhead having a length corresponding to the width of the printing medium.

Examples

Hereinafter, the present disclosure will be described in greater detail with reference to the following examples and comparative examples. The following examples are for illustrative purposes only and are not intended to limit the scope of the disclosure.

Preparation of Capsulated Colorant Using Basic Monomer and Macromonomer

Examples 1-1 to 1-4

Change of Amount of Basic Monomer

Figure 4:
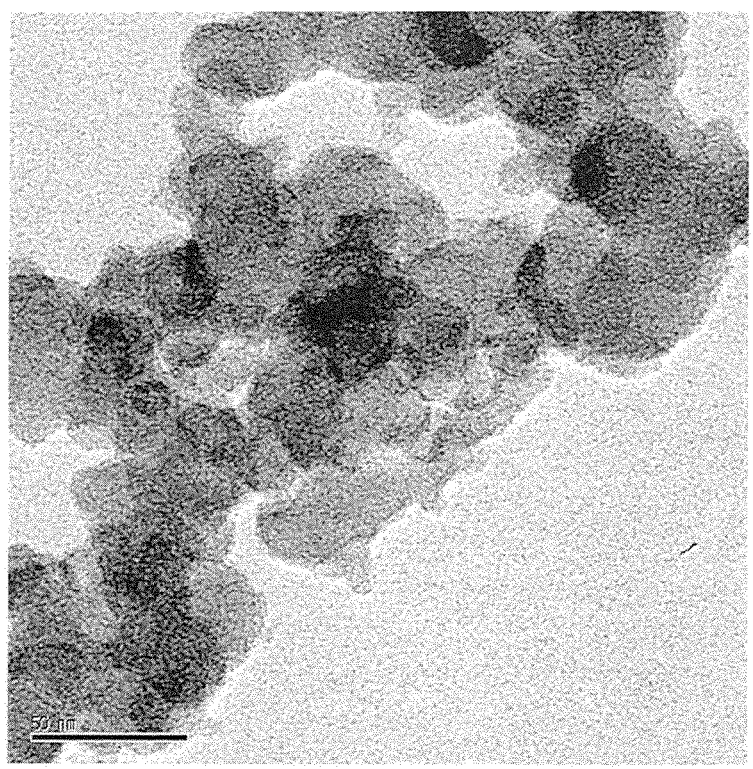
FIG. 4 is a transmission electron microscopy (TEM) image of the capsulated colorant prepared according to Examples 1 and 2.
Figure 5:
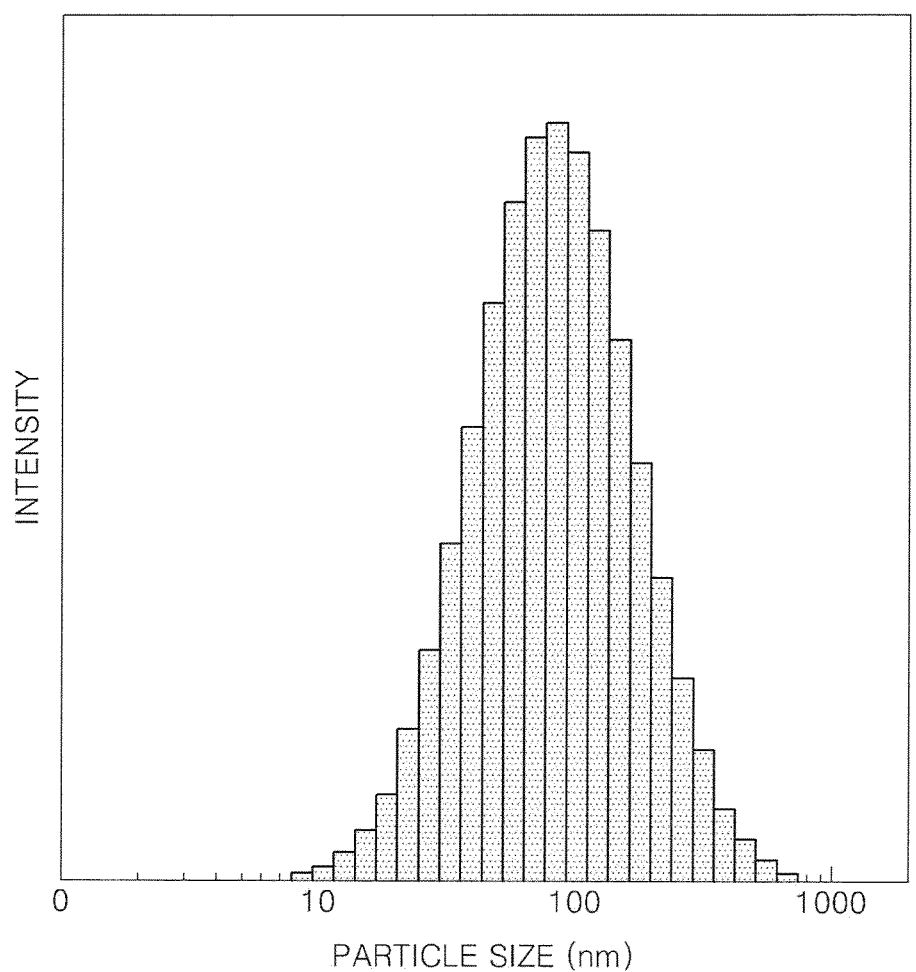
FIG. 5 is a graph of particle size distribution of a capsulated colorant prepared according to Examples 1 and 2.

Capsulated colorants were prepared as listed in Table 1 below according to the following method. A quantified carbon black dispersion (net amounts of carbon black are shown in Table 1) and 90 g of water were added to a reactor, and a quantified PEG-ethyl ether methacrylate as a macromonomer was added, and the mixture was dispersed by stirring. A quantified monomer mixture was added and the mixture was emulsified using ultrasonic waves (or by stirring) for 5 minutes. In this regard, the amount of 2-vinyl pyridine as a basic monomer was changed from 5% to 75% based on the total weight of styrene/butyl acrylate as a polymerizable unsaturated monomer. The temperature of the reactor was increased under a nitrogen atmosphere. When the temperature reached the polymerization temperature (~80° C.), a solution including an initiator (potassium persulfate) dissolved in 10 g of water was added to the reactor to initiate polymerization. The polymerization was performed at a stirring rate of 350 rpm for 24 hours under a nitrogen atmosphere to prepare capsulated colorants. Average particle sizes of the prepared capsulated colorants were measured using a particle size analyzer (Model No.: ELS-Z2 plus, Otsuka Corporation), and the prepared capsulated colorants were dried to measure morphology of the prepared capsulated colorants using transmission electron microscopy (TEM, Model No.: JEM-200CX, Japan Electronic Optics Laboratory Ltd.) images of the capsulated colorants. A TEM image and particle size distribution (average particle size: 103.7 nm) of the capsulated colorant prepared according to Example 1-2 are shown in FIGS. 4 and 5, respectively.

TABLE 1

|  | Example 1-1 | Example 1-2 | Example 1-3 | Example 1-4 |
| --- | --- | --- | --- | --- |
| Carbon black (g) | 10 | 10 | 10 | 10 |
| Styrene (g) | 2.22 | 2.22 | 2.22 | 2.22 |
| Butyl acrylate (g) | 2.22 | 2.22 | 2.22 | 2.22 |
| 2-Vinyl pyridine (g) | 0.22 | 0.44 | 1.34 | 3.33 |
| Potassium persulfate (g) | 0.046 | 0.048 | 0.053 | 0.058 |
| H$_2$O (g) | 100 | 100 | 100 | 100 |
| PEG-ethyl ether methacrylate (g) | 0.5 | 0.5 | 0.5 | 0.5 |

Examples 1-5 to 1-8

Change of Weight Ratio of Carbon Black to Monomer

Figure 6:
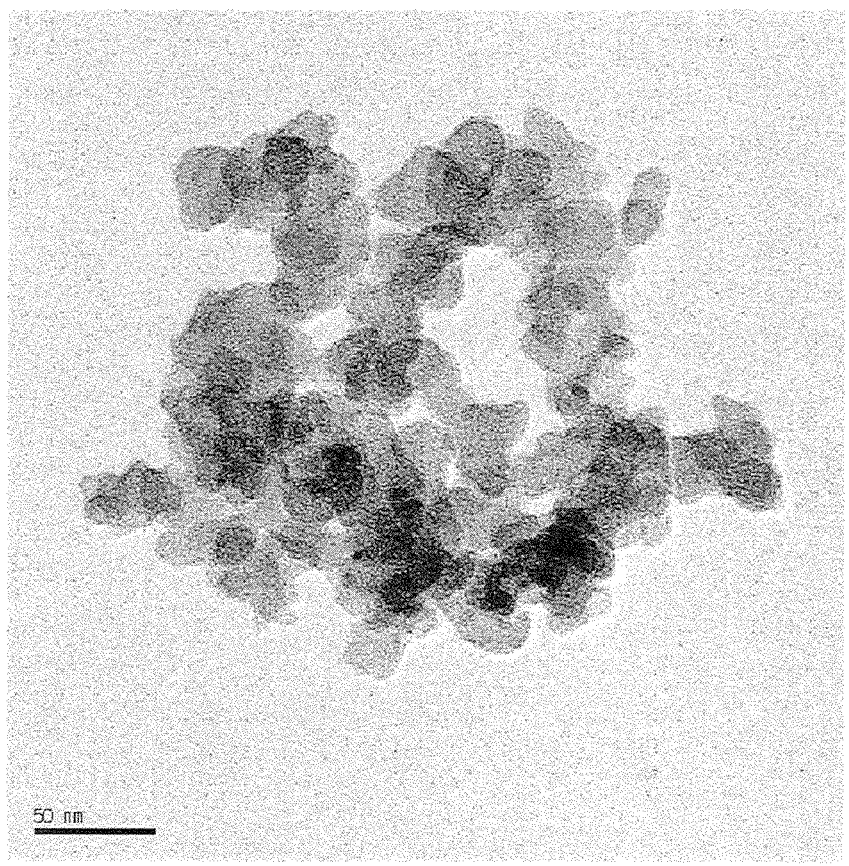
FIG. 6 is a TEM image of a capsulated colorant prepared according to Examples 1 to 6.
Figure 7:
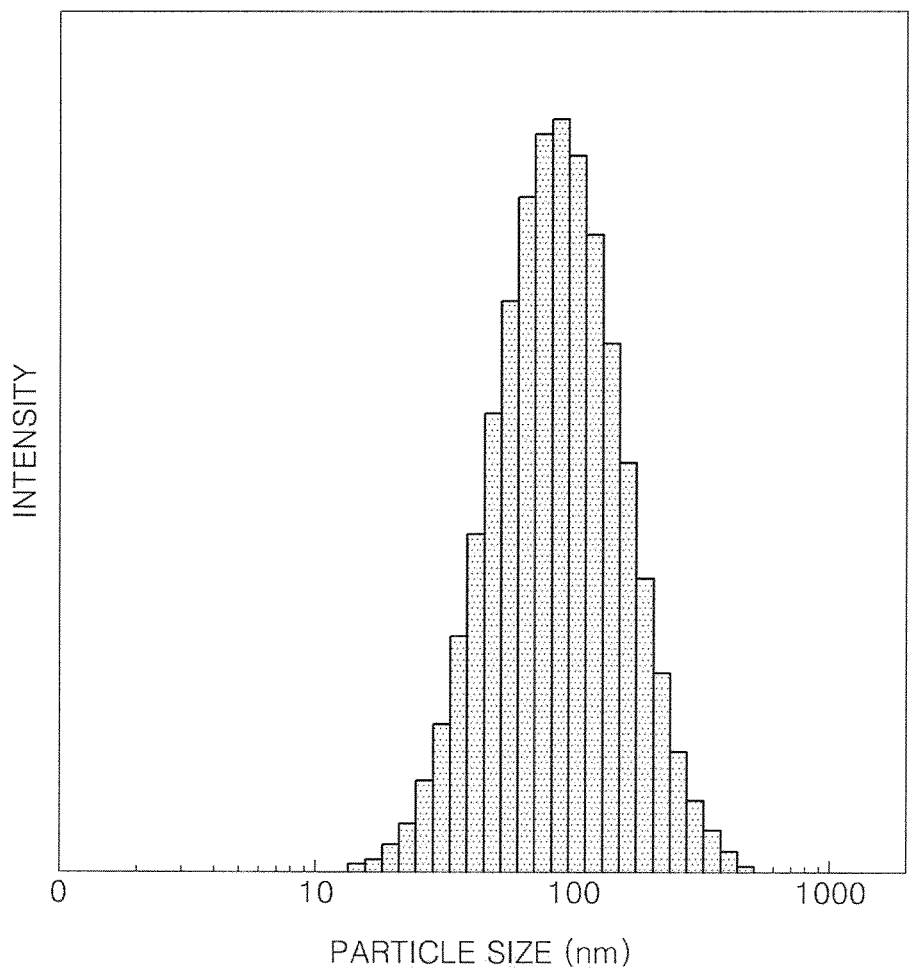
FIG. 7 is a graph of particle size distribution of a capsulated colorant prepared according to Examples 1 to 6.

Capsulated colorants were prepared as listed in Table 2 below according to the following method. A quantified carbon black dispersion (net amounts of carbon black are shown in Table 2) and 90 g of water were added to a reactor, and a quantified PEG-ethyl ether methacrylate as a macromonomer was added, and the mixture was dispersed by stirring. A quantified monomer mixture was added, and the mixture was emulsified using ultrasonic waves (or by stirring) for 5 minutes. The weight ratio of the carbon black to the monomer was changed from 1:1 to 2.5:1, and the amount of the initiator was adjusted according to the changed amount of the monomer (the amount of the initiator is 1 weight % of the weight of the monomer). The temperature of the reactor was increased under a nitrogen atmosphere. When the temperature reached the polymerization temperature (80° C.), a solution including an initiator (potassium persulfate) dissolved in 10 g of water was added to the reactor to initiate polymerization. The polymerization was performed at a stirring rate of 350 rpm for 24 hours under a nitrogen atmosphere to prepare capsulated colorants. The average particle sizes of the prepared capsulated colorants were measured using a particle size analyzer, and the prepared capsulated colorants were dried to measure morphology using TEM. A TEM image and particle size distribution (average particle size: 101.3 nm) of the capsulated colorant prepared according to Example 1-6 are shown in FIGS. 6 and 7, respectively.

TABLE 2

|  | Example 1-5 | Example 1-6 | Example 1-7 | Example 1-8 |
| --- | --- | --- | --- | --- |
| Carbon black (g) | 10 | 10 | 10 | 10 |
| Styrene (g) | 4.2 | 2.4 | 2.22 | 1.5 |
| Butyl acrylate (g) | 4.2 | 2.4 | 2.22 | 1.5 |
| 2-vinyl pyridine (g) | 1.1 | 0.67 | 0.54 | 0.5 |
| potassium persulfate (g) | 0.1 | 0.066 | 0.05 | 0.04 |
| $H_2O$ (g) | 100 | 100 | 100 | 100 |
| PEG-ethyl ether methacrylate (g) | 0.5 | 0.5 | 0.5 | 0.5 |

Examples 1-9 to 1-12

Changes of Types of Basic Monomer (Fixed Amount)

Figure 8:
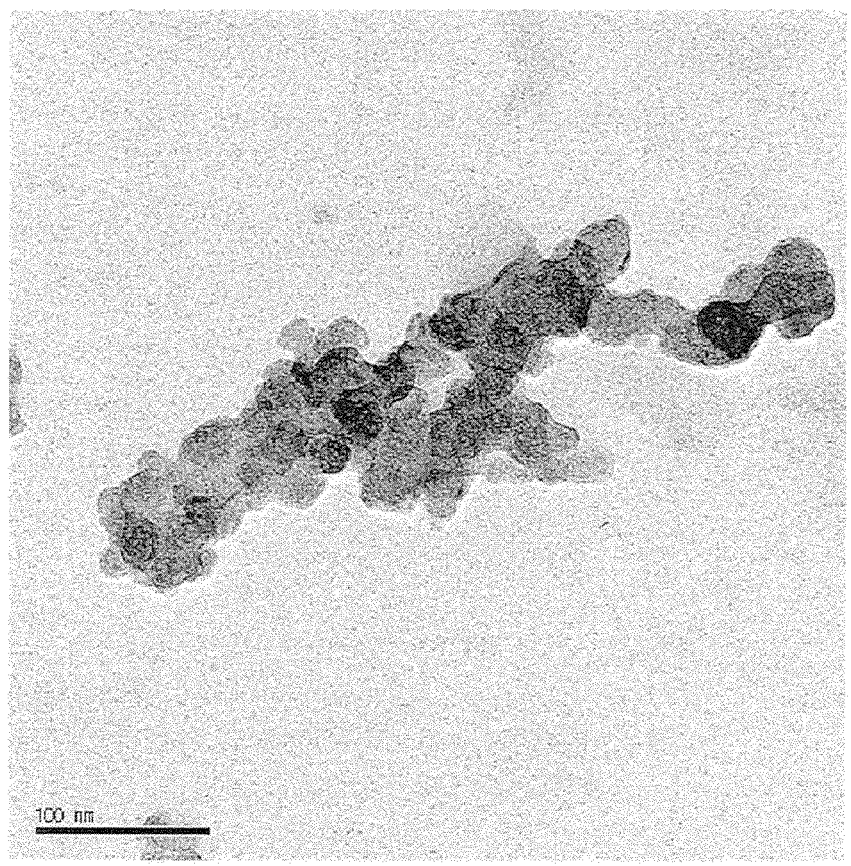
FIG. 8 is a TEM image of a capsulated colorant prepared according to Examples 1 to 12.
Figure 9:
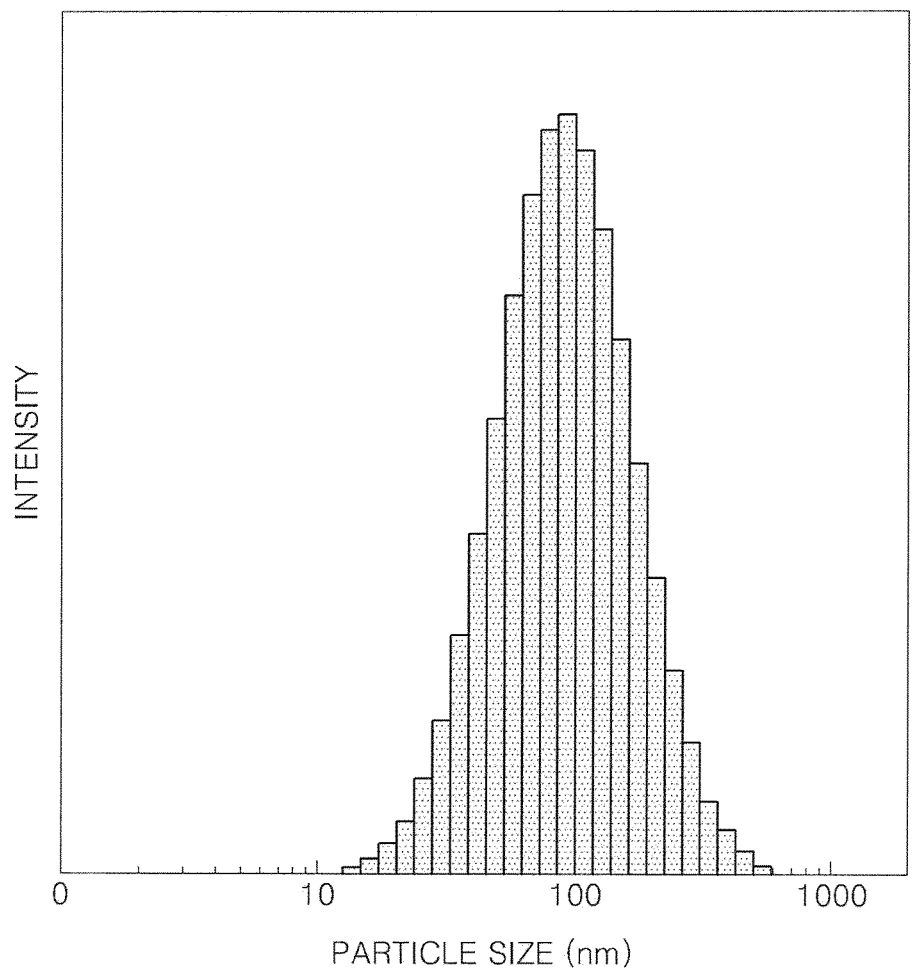
FIG. 9 is a graph of particle size distribution of a capsulated colorant prepared according to Examples 1 to 12.

Capsulated colorants were prepared as listed in Table 3 below according to the following method. A quantified carbon black dispersion (net amounts of carbon black are shown in Table 3) and 90 g of water were added to a reactor, and quantified PEG-ethyl ether methacrylate as a macromonomer was added, and the mixture was dispersed by stirring. A quantified monomer mixture was added, and the mixture was emulsified using ultrasonic waves (or by stirring) for 5 minutes. The amount of the basic monomer was fixed, and 2-vinyl pyridine, 4-vinylpyridine, acryl amide, and N,N-dimethylaminoethyl methacrylate were used as the basic monomer. The temperature of the reactor was increased under a nitrogen atmosphere. When the temperature reached the polymerization temperature (80° C.), a solution including an initiator (potassium persulfate) dissolved in 10 g of water was added to the reactor to initiate polymerization. The polymerization was performed at a stirring rate of 350 rpm for 24 hours under a nitrogen atmosphere to prepare capsulated colorants. The average particle sizes of the prepared capsulated colorants were measured using a particle size analyzer, and the prepared capsulated colorants were dried to measure morphology using TEM. A TEM image and particle size distribution (average particle size: 107.2 nm) of the capsulated colorant prepared according to Example 1-12 are shown in FIGS. 8 and 9, respectively.

TABLE 3

|  | Example 1-9 | Example 1-10 | Example 1-11 | Example 1-12 |
| --- | --- | --- | --- | --- |
| Carbon black (g) | 10 | 10 | 10 | 10 |
| Styrene (g) | 2.22 | 2.22 | 2.22 | 2.22 |
| Butyl acrylate (g) | 2.22 | 2.22 | 2.22 | 2.22 |
| 2-Vinyl pyridine (g) | 0.54 | — | — | — |
| 4-Vinyl pyridine (g) | — | 0.54 | — | — |
| Acryl amide (g) | — | — | 0.54 | — |
| N,N-dimethyl amino-ethyl methacrylate (g) | — | — | — | 0.54 |
| Potassium persulfate (g) | 0.05 | 0.05 | 0.05 | 0.05 |
| $H_2O$ (g) | 100 | 100 | 100 | 100 |
| PEG-ethyl ether methacrylate (g) | 0.5 | 0.5 | 0.5 | 0.5 |

Examples 1-13 to 1-15

Change of Types of Macromonomer

Figure 10:
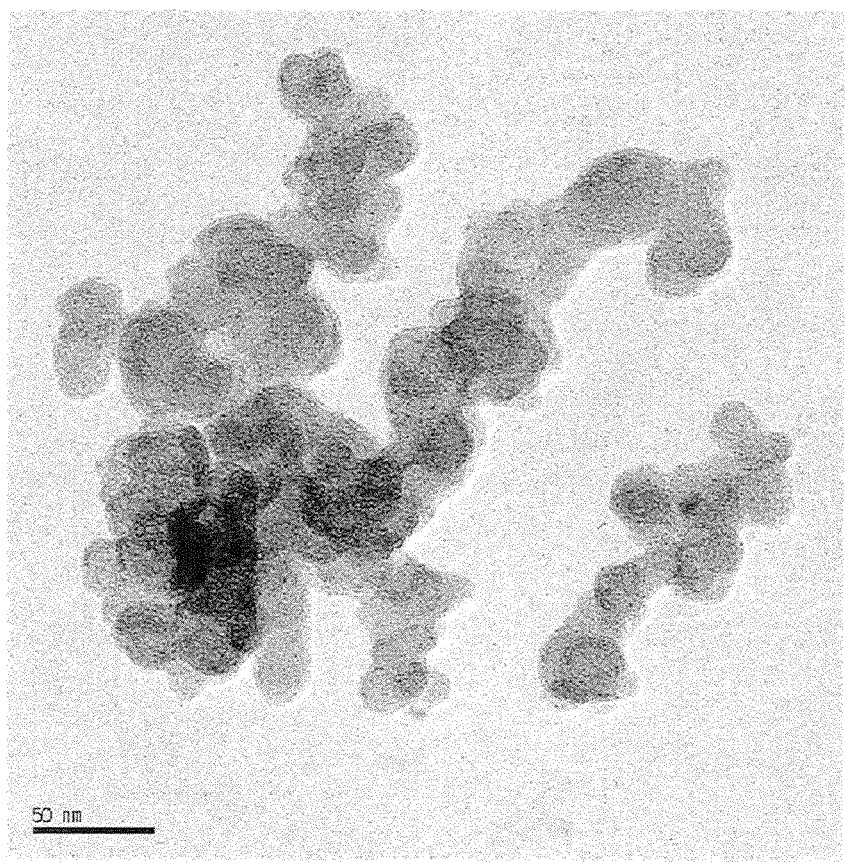
FIG. 10 is a TEM image of a capsulated colorant prepared according to Examples 1 to 15.
Figure 11:
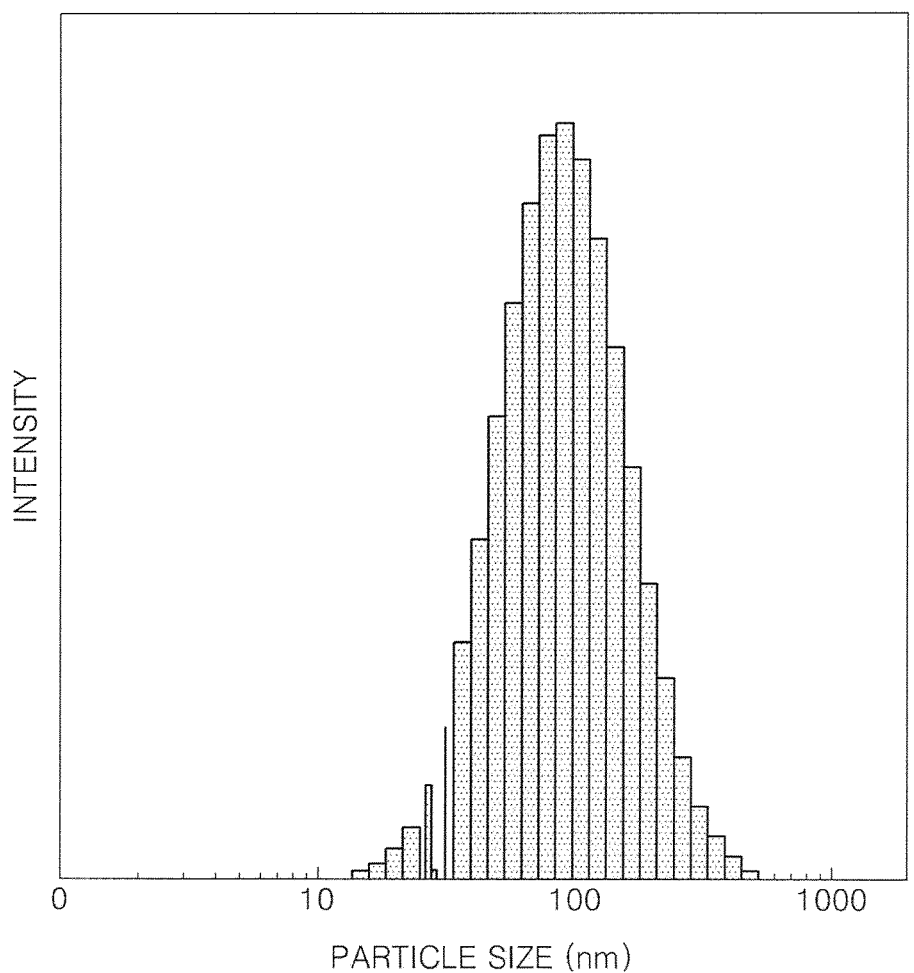
FIG. 11 is a graph of particle size distribution of a capsulated colorant prepared according to Examples 1 to 15.

Capsulated colorants were prepared as listed in Table 4 below according to the following method. A quantified carbon black dispersion (net amounts of carbon black are shown in Table 4) and 90 g of water were added to a reactor, and different types of quantified macromonomers were added, and the mixture was dispersed by stirring. A quantified monomer mixture was added and the mixture was emulsified using ultrasonic waves (or by stirring) for 5 minutes. The PEG-ethyl ether methacrylate, PEG-polystyrene, and PEG-methacrylic silicon were used as the macromonomer, and 2-vinyl pyridine was used as the basic monomer. The temperature of the reactor was increased under a nitrogen atmosphere. When the temperature reached the polymerization temperature (80° C.), a solution including an initiator (potassium persulfate) dissolved in 10 g of water was added to the reactor to initiate polymerization. The polymerization was performed at a stirring rate of 350 rpm for 24 hours under a nitrogen atmosphere to prepare capsulated colorants. The average particle sizes of the prepared capsulated colorants were measured using a particle size analyzer, and the prepared capsulated colorants were dried to measure morphology using TEM. A TEM image and particle size distribution (average particle size: 110.1 nm) of the capsulated colorant prepared according to Example 1-15 are shown in FIGS. 10 and 11, respectively.

TABLE 4

|  | Example 1-13 | Example 1-14 | Example 1-15 |
| --- | --- | --- | --- |
| Carbon black (g) | 10 | 10 | 10 |
| Styrene (g) | 2.22 | 2.22 | 2.22 |
| Butyl acrylate (g) | 2.22 | 2.22 | 2.22 |
| 2-Vinyl pyridine (g) | 0.54 | 0.54 | 0.54 |
| Potassium persulfate (g) | 0.05 | 0.05 | 0.05 |
| $H_2O$ (g) | 100 | 100 | 100 |
| PEG-ethyl ether methacrylate (g) | 0.5 | — | — |
| PEG-polystyrene (g) | — | 0.5 | — |
| PEG-methacrylic silicon (g) | — | — | 0.5 |

Comparative Examples 1-1 to 1-15

Capsulated colorants according to Comparative Examples 1-1 to 1-8 were prepared in the same manner as in Examples 1-1 to 1-8 as listed in Table 5, except that the basic monomer was not used, and sodium dodecyl sulfate (SDS) was used as the emulsifier instead of the macromonomer. Capsulated colorants according to Comparative Examples 1-9 to 1-12 were prepared in the same manner as in Examples 1-9 to 1-12, except that the basic monomer was used, and SDS was used as the emulsifier instead of the macromonomer. Capsulated colorants according to Comparative Examples 1-13 to 1-15 were prepared in the same manner as in Examples 1-13 to 1-15, except that the macromonomer was used and the basic monomer was not used.

TABLE 5

|  | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 |
| --- | --- | --- | --- | --- | --- | --- | --- | --- |
| Carbon black (g) | 10.0 | 10.0 | 10.0 | 10.0 | 10.0 | 10.0 | 10.0 | 10.0 |
| Styrene (g) | 2.2 | 4.4 | 3.0 | 2.2 | 4.2 | 2.4 | 2.2 | 1.5 |

TABLE 5-continued

| Butyl acrylate (g) | 2.2 | 4.4 | 3.0 | 2.2 | 4.2 | 2.4 | 2.2 | 1.5 |
|---|---|---|---|---|---|---|---|---|
| Potassium persulfate (g) | 0.046 | 0.048 | 0.053 | 0.058 | 0.1 | 0.066 | 0.05 | 0.04 |
| $H_2O$ (g) | 100.0 | 100.0 | 100.0 | 100.0 | 100.0 | 100.0 | 100.0 | 100.0 |
| SDS (g) | 0.5 | 0.5 | 0.5 | 0.5 | 0.5 | 0.5 | 0.5 | 0.5 |

| | Comparative Example 1-9 | Comparative Example 1-10 | Comparative Example 1-11 | Comparative Example 1-12 | Comparative Example 1-13 | Comparative Example 1-14 | Comparative Example 1-15 |
|---|---|---|---|---|---|---|---|
| Carbon black (g) | 10.0 | 10.0 | 10.0 | 10.0 | 10.0 | 10.0 | 10.0 |
| Styrene (g) | 2.22 | 2.22 | 2.22 | 2.22 | 2.22 | 2.22 | 2.22 |
| Butyl acrylate (g) | 2.22 | 2.22 | 2.22 | 2.22 | 2.22 | 2.22 | 2.22 |
| 2-Vinyl pyridine (g) | 0.54 | — | — | — | — | — | — |
| 4-Vinyl pyridine (g) | — | 0.54 | — | — | — | — | — |
| Acryl amide (g) | — | — | 0.54 | — | — | — | — |
| N,N-dimethyl amino ethyl methacrylate (g) | — | — | — | 0.54 | — | — | — |
| Potassium persulfate (g) | 0.05 | 0.05 | 0.05 | 0.05 | 0.05 | 0.05 | 0.05 |
| $H_2O$ (g) | 100 | 100 | 100 | 100 | 100 | 100 | 100 |
| PEG-ethyl ether methacrylate g) | — | — | — | — | 0.5 | — | — |
| PEG-polystyrene (g) | — | — | — | — | — | 0.5 | — |
| PEG-methacrylic silicon (g) | — | — | — | — | — | — | 0.5 |
| SDS (g) | 0.5 | 0.5 | 0.5 | 0.5 | — | — | — |

Preparation of Ink Composition

The capsulated colorants prepared according to Examples 1-1 to 1-15, water, an organic solvent, and additives were mixed as listed below, and the mixtures were sufficiently stirred in a stirrer for more than 30 minutes until they reached a homogenized state. The mixtures were passed through a 0.45 μm filter to prepare ink compositions of Examples 2-1 to 2-15.

Examples 2-1 to 2-15

| | |
|---|---|
| Capsulated colorant (Examples 1-1 to 1-5) | 4.5 parts by weight |
| Glycerol | 6.9 parts by weight |
| Diethylene glycol | 8 parts by weight |
| Nonionic surfactant (Model No.: Surfynol465, Air Products, Inc.) | 0.6 parts by weight |
| Water (deionized water) | 80 parts by weight |

The capsulated colorants prepared according to Comparative Examples 1-1 to 1-15, water, an organic solvent, and additives were mixed as listed below, and the mixtures were sufficiently stirred in a stirrer for more than 30 minutes until they reached a homogenized state. The mixtures were passed through a 0.45 μm filter to prepare ink compositions of Comparative Examples 2-1 to 2-15.

Comparative Examples 2-1 to 2-15

| | |
|---|---|
| Capsulated colorant (Comparative Examples 1-1 to 1-5) | 4.5 parts by weight |
| Glycerol | 7.5 parts by weight |
| Diethylene glycol | 8 parts by weight |
| Nonionic surfactant (Model No.: Surfynol465, Air Products, Inc.) | 0.6 parts by weight |
| Water (deionized water) | 80 parts by weight |

Experimental Example 1

Cartridge Storage Stability Test

The degree of nozzle blocking was measured when printing was performed after storing each of the ink compositions prepared according to Examples 2-1 to 2-15 and Comparative Examples 2-1 to 2-15 in an ink cartridge for an inkjet recording apparatus of Samsung Corporation (M-50) at room temperature (25° C.) and a low temperature (−5° C.) for 2 weeks. The results are shown in Table 6 below.

⊚: 5% or less nozzles were blocked.
◯: greater than 5% and 10% or less nozzles were blocked.
Δ: greater than 10% and 20% or less nozzles were blocked.
X: greater than 20% nozzles were blocked.

Experimental Example 2

Ink Storage Stability Test

Each of the ink compositions prepared according to Examples 2-1 to 2-15 and Comparative Examples 2-1 to 2-15 was stored in an ink cartridge of Samsung Corporation at a high temperature (60° C.) and a very low temperature (−18° C.) for 4 weeks. The viscosity was compared with the initial viscosity, and the difference in viscosity was measured. The results are shown in Table 6 below.

⊚: 5% or less change in average rate of viscosity.
◯: greater than 5% and 10% or less change in average rate of viscosity.
Δ: greater than 10% and 20% or less change in average rate of viscosity.
X: greater 20% change in average rate of viscosity.

Experimental Example 3

Abrasion Resistance Test

Each of the ink compositions prepared according to Examples 2-1 to 2-15 and Comparative Examples 2-1 to 2-15 were filled into an M-50 ink cartridge for an inkjet recording apparatus (Samsung Corporation), and a bar pattern (2×10 cm) was printed using a printer (MJC-3300p, Samsung Corporation). The printed resultant was dried for 24 hours. After the bar pattern was rubbed five times using a tester, the optical density (OD) of an image transferred from the bar pattern was compared with the OD of the original bar pattern, and the difference was represented as a percentage. The results are shown in Table 6 below.

$A$=(OD of transferred image/OD of original bar pattern)×100(%)

◎: A<15
○: 15≦A≦30
Δ: 30≦A≦45
X: A>45

Experimental Example 4

Waterfastness Test

Each of the ink compositions prepared according to Examples 2-1 to 2-15 and Comparative Examples 2-1 to 2-15 were filled into an M-50 cartridge for an inkjet recording apparatus (Samsung Corporation), and a bar pattern (2×10 cm) was printed using a printer (MJC-2400C, Samsung Corporation). After 5 minutes, 5 droplets of water were dropped onto the bar pattern, and the printed resultant was dried for 24 hours. A reduced OD of the image after water flew thereon was compared with OD of the original bar pattern, and the difference was represented as a percentage. The results are shown in Table 6 below.

$A$=(OD of image after water flew thereon/OD of original bar pattern)×100(%)

◎: 95≦A
○: 90≦A<95,
Δ: 85≦A<90
X: A<85

Experimental Example 5

Optical Density (OD) Test

Each of the ink compositions prepared according to Examples 2-1 to 2-15 and Comparative Examples 2-1 to 2-15 were filled into an M-50 cartridge for an inkjet recording apparatus (Samsung Corporation), and a bar pattern (2×10 cm) was printed using a printer (MJC-3300p, Samsung Corporation). The printed resultant was dried for 24 hours. The OD of the image was evaluated as shown below. The results are shown in Table 6 below.

$A$=OD of image

◎: A≧1.4
○: 1.2≦A<1.4
Δ: 1.0≦A<1.2
X: A<1.0

Experimental Example 6

Antifoaming Property Test 3 ml of each of the ink compositions prepared according to Examples 2-1 to 2-15 and Comparative Examples 2-1 to 2-15 was added 10 ml of a mess cylinder, and the mess cylinder was sealed. After the mess cylinder was strongly shaken 20 times up and down, the volume of foam was compared with that of foam before shaking the ink composition, and the difference was represented in percentages. The results are shown in Table 6 below.

$A$=(Volume of produced foam/initial volume of ink)×100(%)

◎: A<20
○: 20≦A<50
Δ: 50≦A≦80
X: A>80

TABLE 6

|  | Cartridge Storage stability-viscosity | Ink storage stability | Abrasion resistance | Waterfastness | Optical density | Antifoaming properties |
|---|---|---|---|---|---|---|
| Example 2-1 | ◎ | ◎ | ◎ | ◎ | ◎ | ◎ |
| Example 2-2 | ◎ | ○ | ◎ | ◎ | ◎ | ◎ |
| Example 2-3 | ◎ | ◎ | ◎ | ○ | ○ | ◎ |
| Example 2-4 | ◎ | Δ | ◎ | ◎ | ○ | ◎ |
| Example 2-5 | ○ | ◎ | ◎ | ◎ | ◎ | ○ |
| Example 2-6 | ◎ | ○ | ○ | ◎ | Δ | ◎ |
| Example 2-7 | ○ | ◎ | ◎ | ◎ | ◎ | ◎ |
| Example 2-8 | ◎ | ○ | ◎ | ◎ | ◎ | ◎ |
| Example 2-9 | ◎ | ◎ | ◎ | ○ | ○ | ◎ |
| Example 2-10 | ◎ | ○ | ◎ | ◎ | ◎ | ◎ |
| Example 2-11 | ○ | ◎ | ◎ | ◎ | ◎ | ◎ |
| Example 2-12 | ◎ | ◎ | ◎ | ◎ | ○ | ◎ |
| Example 2-13 | ◎ | ◎ | ◎ | ◎ | Δ | ◎ |
| Example 2-14 | ◎ | ○ | ◎ | ◎ | ◎ | ○ |
| Example 2-15 | ◎ | ◎ | ◎ | ○ | ◎ | ◎ |
| Comparative Example 2-1 | Δ | X | ◎ | ◎ | ○ | X |
| Comparative Example 2-2 | X | Δ | ◎ | ◎ | ○ | X |
| Comparative Example 2-3 | ○ | X | ○ | ◎ | ◎ | X |
| Comparative Example 2-4 | Δ | X | ◎ | ○ | Δ | X |
| Comparative Example 2-5 | X | ○ | ◎ | ◎ | ◎ | X |
| Comparative Example 2-6 | Δ | X | ◎ | ○ | ◎ | X |
| Comparative Example 2-7 | Δ | X | ◎ | ◎ | ○ | X |
| Comparative Example 2-8 | X | ○ | ○ | ◎ | Δ | X |
| Comparative Example 2-9 | ◎ | ◎ | ◎ | ◎ | ◎ | X |
| Comparative Example 2-10 | ○ | ○ | ◎ | ◎ | ◎ | X |
| Comparative Example 2-11 | ◎ | ◎ | ◎ | ○ | ○ | X |
| Comparative Example 2-12 | ○ | ◎ | ◎ | ◎ | ○ | X |

TABLE 6-continued

|  | Cartridge Storage stability-viscosity | Ink storage stability | Abrasion resistance | Waterfastness | Optical density | Antifoaming properties |
|---|---|---|---|---|---|---|
| Comparative Example 2-13 | X | Δ | ◎ | ◎ | ◎ | ◎ |
| Comparative Example 2-14 | Δ | X | ○ | ◎ | Δ | ◎ |
| Comparative Example 2-15 | X | X | ◎ | ◎ | ◎ | ○ |

Referring to Table 6, the ink compositions including the capsulated colorant prepared using the basic monomer and the macromonomer according to Examples 2-1 to 2-8 have better cartridge storage stability, ink storage stability, antifoaming properties, and waterfastness, abrasion resistance, and optical density of printed image than the ink compositions including the capsulated colorant prepared using a conventional emulsifier rather than using the basic monomer and the macromonomer according to Comparative Examples 2-1 to 2-8. In addition, the ink compositions prepared using the basic monomer and SDS as the emulsifier instead of the macromonomer according to Comparative Examples 2-9 to 2-12 have lower antifoaming properties than those prepared according to Examples 2-9 to 2-15. The ink compositions prepared using the macromonomer but without using the basic monomer according to Comparative Examples 2-13 to 2-15 have lower ink storage stability and cartridge storage stability than those prepared according to Examples 2-9 to 2-15.

Since the surface of the colorant having negative charges electrostatically interacts with the basic monomer having positive charges, the surface of the colorant may be efficiently coated with the polymer resin, thereby considerably reducing the amount of the polymer resin that is not coated on the colorant but polymerized. Since the macromonomer is used as the emulsifier, the macromonomer is co-polymerized with the polymerizable unsaturated monomer to form permanent chemical bonds, thereby permanently maintaining dispersion stability of the emulsion obtained by co-polymerization. Since the interaction between the organic solvent and the emulsifier that are used during the preparation of ink is removed, stable physical properties may be maintained for a long period of time and foaming may be prevented.

As described above, images printed using the ink composition according to the present disclosure have excellent waterfastness, abrasion resistance, optical density, and also the ink composition may prevent nozzle blocking and have excellent ink storage stability.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A capsulated colorant comprising a colorant and a polymer resin coating the colorant, wherein the polymer resin is obtained by using a polymerization composition, the polymerization composition comprising a basic monomer, a macromonomer, and a polymerizable unsaturated monomer, wherein the basic monomer and polymerizable unsaturated monomer are different monomers, and the basic monomer comprises at least one structure selected from the group consisting of amine, amide, azole, pyridine and pyrrolidone structures.

2. The capsulated colorant of claim 1, wherein the amine, amide, azole, pyridine and pyrrolidone structures include at least one compound selected from the group consisting of an acryl amide, methacrylamide, N,N-dimethylaminoethyl methacrylate, 2-vinylpyridine, 4-vinylpyridine, N-vinylpyrrolidone, 1-vinylimidazole, vinyl-N-methylpyridinium chloride and 9-vinylcarbazole.

3. The capsulated colorant of claim 1, wherein the macromonomer comprises a water-soluble polymer having an unsaturated hydrocarbon.

4. The capsulated colorant of claim 1, wherein the macromonomer comprises at least one compound selected from the group consisting of an unsaturated polyethylene glycol-based compound, an unsaturated polyester-based compound, an unsaturated acrylate-based compound, an unsaturated polyamide-based compound, an unsaturated epoxy resin-based compound, an unsaturated polystyrene-based compound and an unsaturated fatty acid-based compound.

5. The capsulated colorant of claim 1, wherein the macromonomer comprises at least one compound selected from the group consisting of polyethylene glycol (PEG)-methacrylate, polyethylene glycol (PEG)-ethyl ether methacrylate, polyethylene glycol (PEG)-dimethacrylate, polyethylene glycol (PEG)-modified urethane, polyethylene glycol (PEG)-modified polyester, polyethylene glycol (PEG)-hydroxyethyl methacrylate, polyethylene glycol (PEG)-polystyrene, polyethylene glycol (PEG)-methacrylic silicon, polyester acrylate, hexafunctional polyester acrylate, dendritic polyester acrylate, carboxy polyester acrylate, polyester methacrylate, polymethyl methacrylate, polystyrene-acrylonitrile, polybutyl acrylate, polyisobutylmethacrylate, fatty acid modified epoxy acrylate, and derivatives thereof.

6. The capsulated colorant of claim 1, wherein the polymerizable unsaturated monomer comprises at least one compound selected from the group consisting of a compound having at least two double bonds, unsaturated carboxylic acid, vinyl cyanide monomer, unsaturated carboxylic acid alkyl ester, unsaturated carboxylic acid hydroxyalkyl ester, unsaturated carboxylic acid amide, aromatic vinyl monomer, methyl vinyl ketone and vinylidene chloride.

7. The capsulated colorant of claim 1, wherein the amount of the basic monomer is in the range of about 1 to about 80 parts by weight based on 100 parts by weight of the polymerizable unsaturated monomer.

8. The capsulated colorant of claim 1, wherein the amount of the macromonomer is in the range of about 1 to about 100 parts by weight based on 100 parts by weight of the polymerizable unsaturated monomer.

9. An ink composition comprising the capsulated colorant according to claim 1.

10. The ink composition of claim 9, wherein the ink composition comprises about 1 to about 20 parts by weight of the capsulated colorant and about 80 to about 99 parts by weight of the solvent.

11. The ink composition of claim 9, wherein the solvent is water; or a mixed solution comprising at least one organic solvent selected from monohydric alcohol, polyhydric alcohol, ketone, ester, a nitrogen-containing solvent, and a sulfur-containing solvent and water.

12. The ink composition of claim 9, having a surface tension of about 15 to about 70 dyne/cm at 20° C. and a viscosity of about 1 to about 20 cps.

13. An ink set comprising at least two types of ink compositions comprising a capsulated colorant according to claim 1.

14. An ink cartridge for an inkjet recording apparatus comprising the ink set of claim 13.

15. An inkjet recording apparatus comprising the cartridge of claim 14.

16. The capsulated colorant of claim 1, wherein the amount of the basic monomer is in the range of about 10 to about 50 parts by weight based on 100 parts by weight of the polymerizable unsaturated monomer, and the macromonomer is in the range of about 5 to about 50 parts by weight based on 100 parts by weight of the polymerizable unsaturated monomer.

17. The capsulated colorant of claim 1, wherein a weight ratio of the colorant to the total combined weight of the basic monomer, macronomer, and polymerizable unsaturated monomer is in the range of about 1:1 to about 2.5:1.

* * * * *

UNITED STATES PATENT AND TRADEMARK OFFICE
CERTIFICATE OF CORRECTION

PATENT NO. : 8,420,730 B2
APPLICATION NO. : 12/715960
DATED : April 16, 2013
INVENTOR(S) : Jong-In Lee et al.

It is certified that error appears in the above-identified patent and that said Letters Patent is hereby corrected as shown below:

In the Claims

In Col. 21, Line 21, In Claim 17, delete "macronomer," and insert --macromonomer,--, therefor.

Signed and Sealed this
Eighth Day of October, 2013

Teresa Stanek Rea
*Deputy Director of the United States Patent and Trademark Office*